US012750313B2

(12) United States Patent
Eastlake, III

(10) Patent No.: US 12,750,313 B2
(45) Date of Patent: Sep. 29, 2026

(54) SERVICE FUNCTION CHAINING PARALLELISM AND DIVERSIONS

(71) Applicant: Huawei Technologies Co., Ltd., Shenzhen (CN)

(72) Inventor: Donald Eggleston Eastlake, III, Apopka, FL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 18/393,871

(22) Filed: Dec. 22, 2023

(65) Prior Publication Data

US 2024/0179094 A1 May 30, 2024

Related U.S. Application Data

(63) Continuation of application No. PCT/US2022/034571, filed on Jun. 22, 2022.

(60) Provisional application No. 63/213,453, filed on Jun. 22, 2021.

(51) Int. Cl.

| | |
|---|---|
| ***H04L 45/76*** | (2022.01) |
| ***H04L 45/00*** | (2022.01) |
| ***H04L 45/24*** | (2022.01) |
| ***H04L 69/22*** | (2022.01) |

(52) U.S. Cl.

CPC .............. *H04L 45/76* (2022.05); *H04L 45/20* (2013.01); *H04L 45/24* (2013.01); *H04L 69/22* (2013.01)

(58) Field of Classification Search

CPC ......... H04L 45/76; H04L 45/20; H04L 45/24; H04L 69/22

See application file for complete search history.

(56) References Cited

U.S. PATENT DOCUMENTS

| | | | | |
|---|---|---|---|---|
| 11,258,701 | B2 * | 2/2022 | Hu | H04L 47/2441 |
| 11,722,559 | B2 * | 8/2023 | Tidemann | H04L 69/22<br>370/389 |
| 2017/0163531 | A1 * | 6/2017 | Kumar | H04L 45/74 |
| 2018/0041524 | A1 | 2/2018 | Reddy et al. | |
| 2019/0014454 | A1 * | 1/2019 | Garcia Martin | H04L 12/1425 |
| 2020/0145331 | A1 * | 5/2020 | Bhandari | H04L 45/22 |
| 2020/0169506 | A1 * | 5/2020 | Chang | H04L 69/22 |
| 2022/0060370 | A1 * | 2/2022 | Gage | H04L 45/24 |

OTHER PUBLICATIONS

Zhang, Y., et al., "ParaBox: Exploiting Parallelism for Virtual Network Functions in Service Chaining," Proceedings of the Symposium on SDN Research, SOSR '17, Apr. 3, 2017, 7 pages.

Brockners, F., Ed., et al., "Network Service Header (NSH) Encapsulation for In-situ OAM (IOAM) Data," draft-ietf-sfc-ioam-nsh-13, May 5, 2023, 9 pages.

"DOD Standard Transmission Control Protocol," IEN: 129, RFC: 761, Jan. 1980, 88 pages.

(Continued)

*Primary Examiner* — Ajay Cattungal

(74) *Attorney, Agent, or Firm* — Conley Rose, P.C.

(57) ABSTRACT

A service function chain (SFC) merging method implemented by a service function (SF) node. The SFC merging method includes receiving a plurality of diverted SFC packets; determining a set of matching diverted SFC packets from the plurality of diverted SFC packets; merging the set of matching diverted SFC packets into a merged SFC packet; and transmitting the merged SFC packet.

20 Claims, 10 Drawing Sheets

(56) References Cited

OTHER PUBLICATIONS

"Transmission Control Protocol," Darpa Internet Program Prtocol Specification, Sep. 1981, 91 pages.
Halpern, J., Ed., et al., "Service Function Chaining (SFC) Architecture," Internet Engineering Task Force (IETF), RFC 7665, Oct. 2015, 32 pages.
Quinn, P., Ed., et al., "Network Service Header (NSH)," Internet Engineering Task Force (IETF), RFC 8300, Jan. 2018, 40 pages.

* cited by examiner

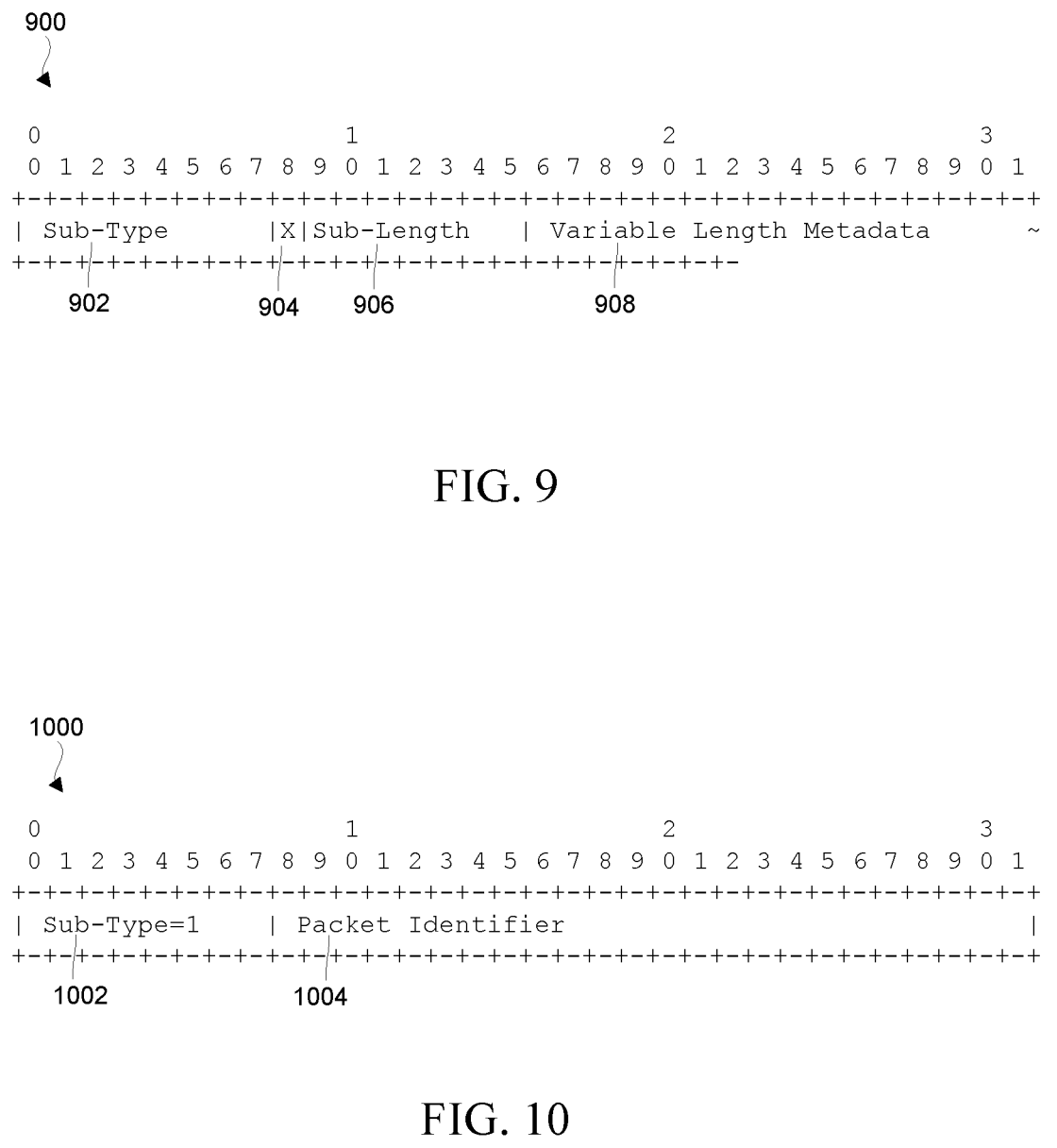

900

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-Type      |X|Sub-Length   | Variable Length Metadata      ~
+-+-+-+-+-+-+-+-+-+-+-+-+-+-+-+-+-+-+-+-+-+-+-+-+-
```

902 904 906 908

FIG. 9

1000

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-Type=1    | Packet Identifier                               |
+-+-+-+-+-+-+-+-+-+-+-+-+-+-+-+-+-+-+-+-+-+-+-+-+-+-+-+-+-+-+-+-+
```

1002 1004

FIG. 10

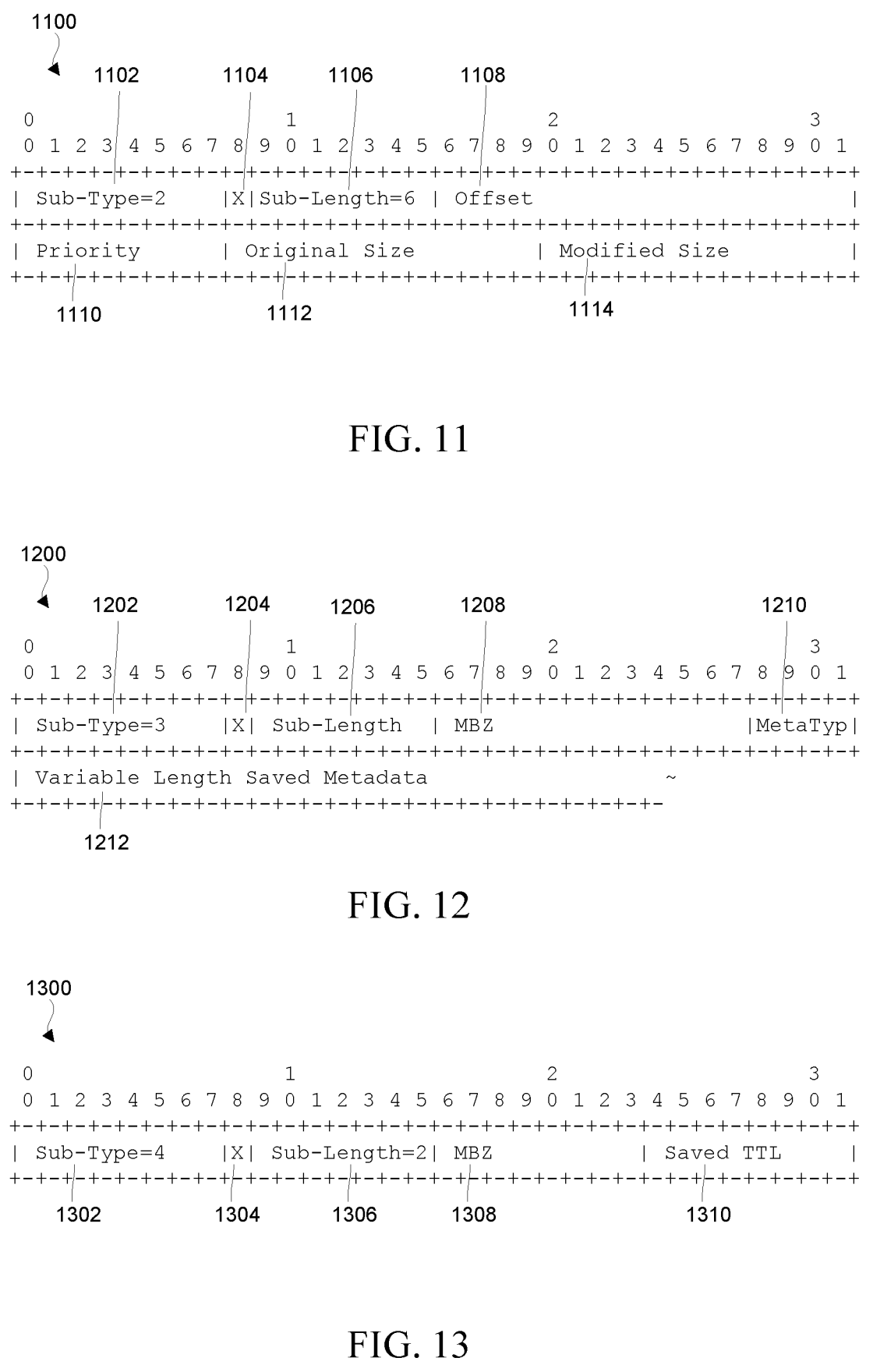

```
1100

     1102        1104    1106       1108
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-Type=2    |X|Sub-Length=6 | Offset                        |
+-+-+-+-+-+-+-+-+-+-+-+-+-+-+-+-+-+-+-+-+-+-+-+-+-+-+-+-+-+-+-+-+
| Priority      | Original Size         | Modified Size         |
+-+-+-+-+-+-+-+-+-+-+-+-+-+-+-+-+-+-+-+-+-+-+-+-+-+-+-+-+-+-+-+-+
   1110            1112                    1114
```

FIG. 11

```
1200

     1202        1204     1206      1208                   1210
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-Type=3    |X| Sub-Length  | MBZ                   |MetaTyp|
+-+-+-+-+-+-+-+-+-+-+-+-+-+-+-+-+-+-+-+-+-+-+-+-+-+-+-+-+-+-+-+-+
| Variable Length Saved Metadata                        ~
+-+-+-+-+-+-+-+-+-+-+-+-+-+-+-+-+-+-+-+-+-+-+-+-+-+-+-+-
     1212
```

FIG. 12

```
1300

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-Type=4    |X| Sub-Length=2| MBZ           | Saved TTL     |
+-+-+-+-+-+-+-+-+-+-+-+-+-+-+-+-+-+-+-+-+-+-+-+-+-+-+-+-+-+-+-+-+
   1302        1304     1306     1308              1310
```

FIG. 13

SERVICE FUNCTION CHAINING PARALLELISM AND DIVERSIONS

CROSS-REFERENCE TO RELATED APPLICATIONS

This application is a continuation of International Patent Application No. PCT/US2022/034571 filed on Jun. 22, 2022, by Futurewei Technologies, Inc., and titled "Service Function Chaining Parallelism and Diversions," which claims priority to U.S. Provisional Application No. 63/213,453, filed Jun. 22, 2021 by Futurewei Technologies, Inc., and titled "Service Function Chaining Parallelism and Diversions." Both of the aforementioned patent applications are hereby incorporated by reference in their entireties.

TECHNICAL FIELD

The present disclosure is generally related to the field of network communications and, in particular, to systems and methods for service function chaining paralellism and diversions.

BACKGROUND

Service functions (SFs) are widely deployed and utilized in many networks. These service functions provide a range of features such as security, wide area network (WAN) acceleration, and server load balancing. SFs may be instantiated at different points in the network infrastructure such as the WAN, data center, and so forth.

Service function chaining is the processing of packets through a sequence of SFs (i.e., a service function chain (SFC)) within an SFC domain by the addition of path information and metadata on entry to that domain, the use and modification of that path information and metadata to step the packet through a sequence of SFs, and the removal of that path information and metadata on exit from that domain. The Internet Engineering Task Force (IETF) has standardized a method for SFC as described in IETF document Request for Comments (RFC) 7665 entitled "Service Function Chaining (SFC) Architecture" by J. Halpern, et al., published October 2015, and IETF document RFC 8300 entitled "Network Service Header (NSH)" by P. Quinn, et al., published January 2018. The present disclosure is primarily in reference to SFC as discussed in these IETF documents, but those skilled in the art will readily appreciate its applicability to other methods of SFC.

SUMMARY

A first aspect relates to a SFC diversion method implemented by a service function SF node. The SFC diversion method includes receiving an SFC packet; determining, based on packet data, that the SFC packet is to be rerouted from a first Service Function Forwarder (SFF) of the SFC to a second SFF of the SFC; modifying a service index (SI) in a NSH of the SFC packet to reroute the SFC packet to the second SFF; and transmitting the SFC packet.

In a first implementation form of the SFC diversion method according to the first aspect, the SFC packet is received from a third SFF of the SFC, and wherein transmitting the SFC packet comprises returning the SFC packet with the SI as modified to the third SFF for forwarding to the second SFF In a second implementation form of the SFC diversion method according to the first aspect or any preceding implementation form of the first aspect, the SF node is also configured as an SFF, and wherein transmitting the SFC packet comprises transmitting the SFC packet with the SI as modified to the second SFF.

In a third implementation form of the SFC diversion method according to the first aspect or any preceding implementation form of the first aspect, the second SFF is a new SFF added to the SFC.

In a fourth implementation form of the SFC diversion method according to the first aspect or any preceding implementation form of the first aspect, the second SFF is an existing SFF along a Service Function Path (SFP) of the SFC packet.

A second aspect relates to a SFC multi-path diversion method implemented by a SF node. The SFC multi-path diversion method includes receiving a SFC packet; determining, based on packet data, that the SFC packet is to be diverted to multiple Service Function Paths (SFPs) of the SFC; generating a copy of the SFC packet for each of the multiple SFPs to produce a plurality of diverted SFC packets; modifying the plurality of diverted SFC packets to include merging information for merging the plurality of diverted SFC packets; and transmitting the plurality of diverted SFC packets.

In a first implementation form of the SFC multi-path diversion method according to the second aspect, the SFC packet is received from a SFF of the SFC, and wherein transmitting the plurality of diverted SFC packets comprises returning the plurality of diverted SFC packets to the SFF In a second implementation form of the SFC multi-path diversion method according to the second aspect or any preceding implementation form of the second aspect, the SF node is also configured as an SFF, and wherein transmitting the plurality of diverted SFC packets comprises transmitting each of the diverted SFC packets to a different SFF of the SFC.

In a third implementation form of the SFC multi-path diversion method according to the second aspect or any preceding implementation form of the second aspect, the SFC multi-path diversion method further includes modifying, in each of the plurality of diverted SFC packets, a Service Path Identifier (SPI) field in a NSH from a first SPI to a second SPI corresponding to a rendezvous point (RP) node.

In a fourth implementation form of the SFC multi-path diversion method according to the second aspect or any preceding implementation form of the second aspect, the SFC multi-path diversion method further includes modifying, in each of the plurality of diverted SFC packets, a SI field in the NSH from a first SI to second SI corresponding to the RP node.

In a fifth implementation form of the SFC multi-path diversion method according to the second aspect or any preceding implementation form of the second aspect, the SFC multi-path diversion method further includes constructing, for each of the plurality of diverted SFC packets, rendezvous point information (RePIn) data structure for merging the plurality of diverted SFC packets at a Rendezvous point; and inserting, in each of the plurality of diverted SFC packets, the RePIn data structure into the NSH.

In a sixth implementation form of the SFC multi-path diversion method according to the second aspect or any preceding implementation form of the second aspect, the RePIn data structure comprises the first SPI and first SI from the NSH.

In a seventh implementation form of the SFC multi-path diversion method according to the second aspect or any preceding implementation form of the second aspect, the RePIn data structure comprises a packet identification data structure.

In an eighth implementation form of the SFC multi-path diversion method according to the second aspect or any preceding implementation form of the second aspect, the RePIn data structure comprises a saved metadata data structure comprising metadata from the NSH to be restored in a merged SFC packet at the RP using the plurality of diverted SFC packets.

In a ninth implementation form of the SFC multi-path diversion method according to the second aspect or any preceding implementation form of the second aspect, the RePIn data structure comprises a saved time to live (TTL) data structure comprising a TTL to be restored in the merged SFC packet at the RP using the plurality of diverted SFC packets.

In a tenth implementation form of the SFC multi-path diversion method according to the second aspect or any preceding implementation form of the second aspect, the SFC multi-path diversion method further includes setting a new TTL for one or more diverted SFC packet of the plurality of diverted SFC packets.

In an eleventh implementation form of the SFC multi-path diversion method according to the second aspect or any preceding implementation form of the second aspect, the SFC multi-path diversion method further includes removing unnecessary saved metadata from one or more of the diverted SFC packets in the plurality of diverted SFC packets prior to returning the plurality of diverted SFC packets to the SFF.

In a twelfth implementation form of the SFC multi-path diversion method according to the second aspect or any preceding implementation form of the second aspect, the SFC multi-path diversion method further includes inserting the RePIn data structure into the NSH preceding any existing RePIn data structure in the NSH.

In a thirteenth implementation form of the SFC multi-path diversion method according to the second aspect or any preceding implementation form of the second aspect, the SFC multi-path diversion method further includes inserting the RePIn data structure into a second NSH and inserting the second NSH after the NSH.

A third aspect relates to a SFC merging method implemented by a SF node. The SFC merging method includes receiving a plurality of diverted SFC packets; determining a set of matching diverted SFC packets from the plurality of diverted SFC packets; merging the set of matching diverted SFC packets into a merged SFC packet; and transmitting the merged SFC packet.

In a first implementation form of the SFC merging method according to the third aspect, the SFC merging method further includes buffering the set of matching diverted SFC packets in a memory buffer until all of the diverted matching SFC packets in the set of matching diverted SFC packets are received.

In a second implementation form of the SFC merging method according to the third aspect or any preceding implementation form of the third aspect, the SFC merging method further includes extracting merging information from each diverted SFC packet in the set of matching diverted SFC packets.

In a third implementation form of the SFC merging method according to the third aspect or any preceding implementation form of the third aspect, the SFC merging method further includes restoring a saved TTL from a diverted SFC packet in the set of matching diverted SFC packets into a NSH of the merged SFC packet.

In a fourth implementation form of the SFC merging method according to the third aspect or any preceding implementation form of the third aspect, the SFC merging method further includes restoring a saved SPI and a saved a SI from a diverted SFC packet in the set of matching diverted SFC packets into the NSH of the merged SFC packet.

In a fifth implementation form of the SFC merging method according to the third aspect or any preceding implementation form of the third aspect, the SFC merging method further includes restoring a saved metadata from a diverted SFC packet in the set of matching diverted SFC packets into the NSH of the merged SFC packet.

In a sixth implementation form of the SFC merging method according to the third aspect or any preceding implementation form of the third aspect, the SFC merging method further includes selecting one of the matching diverted SFC packets in the set of matching diverted SFC packets to modify into the merged SFC packet.

In a seventh implementation form of the SFC merging method according to the third aspect or any preceding implementation form of the third aspect, the SFC merging method further includes comparing a saved SPI in an initial NSH in each matching diverted SFC packet in the set of matching diverted SFC packets; and generating an error when the saved SPI in each matching diverted SFC packet in the set of matching diverted SFC packets are not the same.

In an eighth implementation form of the SFC merging method according to the third aspect or any preceding implementation form of the third aspect, the SFC merging method further includes comparing a saved SI in the initial NSH in each matching diverted SFC packet in the set of matching diverted SFC packets; and generating an error when the saved SI in each matching diverted SFC packet in the set of matching diverted SFC packets are not the same.

In a ninth implementation form of the SFC merging method according to the third aspect or any preceding implementation form of the third aspect, the SFC merging method further includes restoring a minimum saved TTL selected from the set of matching diverted SFC packets into a NSH of the merged SFC packet.

In a tenth implementation form of the SFC merging method according to the third aspect or any preceding implementation form of the third aspect, the SFC merging method further includes merging a payload in each matching diverted SFC packet in the set of matching diverted SFC packets into the merged SFC packet.

A fourth aspect relates to a SF node comprising network communication means, a data storage means such as memory, and a processing means, the SF node specially configured to perform any of the preceding methods.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 illustrates a RePIn VLCH sub-type-length-variable (TLV) according to an embodiment of the present disclosure.

FIG. 10 illustrates a packet identifier special sub-TLV according to an embodiment of the present disclosure.

FIG. 11 illustrates a packet extent modified sub-TLV according to an embodiment of the present disclosure.

FIG. 12 illustrates a saved metadata sub-TLV according to an embodiment of the present disclosure.

FIG. 13 illustrates a saved TTL sub-TLV according to an embodiment of the present disclosure.

DETAILED DESCRIPTION

Figure 1:
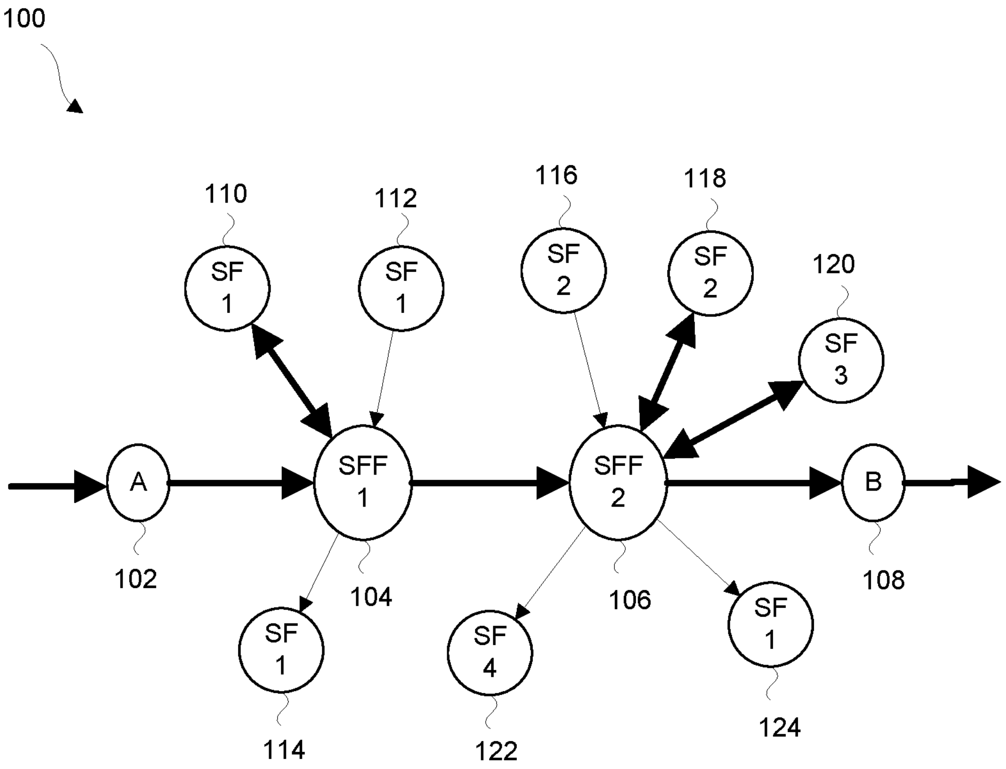
FIG. 1 illustrates an SFC domain according to an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An SFC defines an ordered set of abstract SFs and ordering constraints applied to packets and/or frames and/or flows selected as a result of classification. An SFC is designed to steer packets through a series of SFs within an SFC domain. An SF is a program or node configured to provide a specific service. For example, SFs can discard packets (examples: Firewall or DDOS filter), duplicate packets to a new path (examples: debugging, lawful intercept), add packets (example: manipulation lengthens packet which requires fragmentation), or perform other tasks. At the entrance of the SFC domain, an ingress node, referred to as a Classifier, adds a NSH to packets. The NSH includes a path identifier identifying a service path and a step count along that path. The NSH is used to control the path of a packet within the SFC domain, referred to as an SFP, and to optionally augment the packet with metadata. The routing of the packet within the SFC domain is performed by SF Forwarders (SFFs). An SFF is responsible for forwarding traffic to one or more connected service functions according to information carried in the SFC encapsulation, as well as handling traffic coming back from the SF. Additionally, an SFF is responsible for re-classifying traffic when needed and supported, transporting traffic to another SFF (in the same or different type of overlay), and terminating the Service Function Path (SFP). But, despite these flexibilities, the sequence of SFs is usually assumed to be a single chain as controlled by the service path identifier (SPI)/service index (SI) or by the sequence of SPI/SIs if re-classification occurs within the chain. The NSH is removed at the exit of the SFC domain by an egress node. Currently, there is no existing method for performing SFs in parallel paths or for having SFC paths re-join. Additionally, there is no existing method for inserting (i.e., splicing in) one or more new SFFs while the packet is traversing an SFP, or for excluding (i.e., splicing out) one or more existing SFFs in a SFP while the packet is traversing the SFP.

To address one or more of the above technical problems, various embodiments of the present disclosure provide the ability to split a Service Function Path (SFP) into two or more sub-paths or parallel paths that are later re-joined, and the ability to splice in one or more additional service functions into an existing SFP or splice out one or more service functions in an existing SFP. In particular, disclosed herein are embodiments that use rendezvous-point information (RePIn) such that parallel SFPs can be recombined, or a diversion can rejoin an existing SFP. The disclosed embodiments include, among other things, a method of inserting RePin information into Type 2 Network Service Header (NSH) Metadata to support multiple levels of parallelism and to minimize interference to metadata use by service functions in each parallel path. Various embodiments include a method of saving and later restoring NSH metadata that is not Type 2. Various embodiments also include a method of identifying portions of a packet changed, removed, or inserted by each parallel processing path so the packets processed in parallel can be recombined.

FIG. 1 illustrates an SFC domain 100 according to an embodiment of the present disclosure. The SFC domain includes an ingress node A 102, SFF1 104, SFF2 106, and an egress node B 108. The SFC domain is not limited to the number of SFFs or SFs shown in FIG. 1. Traffic (i.e., packets) passes through the ingress node A 102, where the packets are classified and an NSH header (e.g., IETF NSH 200 in FIG. 2) is added to each packet. The traffic proceeds through a sequence of SFFs (e.g., SFF1 104, SFF2 106, etc.). Each of the SFFs sends the traffic sequentially to one or more SFs. Each SF performs some operation on the traffic, for example firewall, Network Address Translation (NAT), deep packet inspection, lawful intercept, load balancer, or other service, and then returns the packet to the SFF from which the packet was received.

As an example, in FIG. 1, a packet travels, as indicated by the heavier arrows, through Node A 102 where the packet is classified and an NSH added. The packet is then routed to SFF1 104, which sends the packet to and receives the packet back from SF1 110. As shown in FIG. 1, there may be multiple instances of the same SFs attached to the same or different SFFs. The numbering of the SFs indicates a logical function so, in this example, there are four nodes labeled SF1 (SF1 110, SF1 112, SF1 114, and SF1 124) that perform the same function and two SF2 nodes (SF2 116 and SF2 118)

that perform the same function. An SF can receive one or more SFC packets from an SFF. An SF can return to the SFF a larger or smaller number of SFC packets than received from the SFF. That is to say, SFC packets can be discarded or created by an SF. An example of where discarding packets might be desirable is denial-of-service attack amelioration. During a denial-of-service attack amelioration, an SF could examine packets, classify some of the packets as part of the attack and discard them, and let other packets through. An example where it would be desirable to create packets would be a lawful intercept SF. A lawful intercept SF examines packets and, if the SF determines that the packet should be subject to the lawful intercept, makes a copy of the packet with new addressing and a new NSH. The SF then sends that copy to a law enforcement facility while also forwarding all original packets towards their original intended destination.

After receiving the packet back from SF1 110, SFF1 104 routes the packet to SFF2 106. SFF2 106 sends the packet to and receives the packet back from SF2 118. SFF2 106 then sends the packet to and receives the packet back from SF3 120. The logical function associated with SF4 122 is not used in the example service chain. SFF2 106 routes the packet to egress node B 108. Egress node B 108 removes the NSH from the packet, and forwards the packet towards its destination. It should be noted that ingress node A 102 and egress node B 108 are also considered to be SFFs. For instance, ingress node A 102 could send the packet to one or more SFs, besides SF1 104, after adding the NSH to the packet. Additionally, egress node B 108 could send the packet to one or more SFs before removing the NSH.

Figure 2:
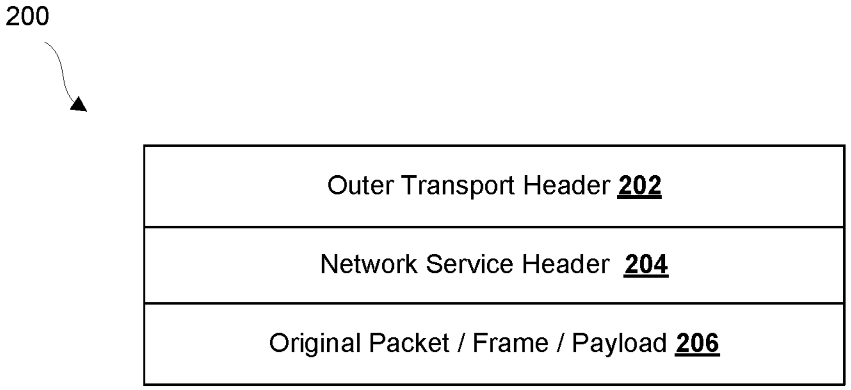
FIG. 2 illustrates a data packet according to an embodiment of the present disclosure.

FIG. 2 illustrates a data packet 200 according to an embodiment of the present disclosure. The data packet 200 represents a packet being processed inside a SFP (referred to herein as an SFC packet). In particular, the data packet 200 represents a packet on the SFP after ingress (e.g., ingress node A 102 of SFC domain 100 in FIG. 1) and before egress (e.g., egress node B 108 of SFC domain 100 in FIG. 1) for the SFC domain. The data packet 200 includes an outer transport header 202, an NSH 204, and the original packet, frame, or payload 206 (i.e., the data being carried by the packet). The outer transport header 202 includes addressing information (e.g., the source and destination process, or port numbers) for transporting the data packet 200 to an SFF. Although labeled a "header," the outer transport header 202 could appear at the beginning or end of a packet, or even mixed with other information in the packet as long as each node the packet transits can access needed information from the outer transport header 202.

The NSH 204 is used to encapsulate and control the subsequent path of traffic. The NSH 204 is designed to encapsulate an original packet or frame (e.g., packet/frame/payload 206) and, in turn, be encapsulated by an outer transport encapsulation (e.g., outer transport header 202), which is used to deliver the NSH 204 to NSH-aware/SFC-encapsulation-aware network elements (e.g., SFF1 104 and SFF2 106 in FIG. 1 of SFC domain 100). The NSH 204 does not alter the packet/frame/payload 206.

During the transit of the data packet 200, the SFF removes the outer transport header 202 from the data packet 200. The SFF then decides on the next forwarding step and either (1) adds a new transport header, (2) in case of error, discards or logs the packet and not forward the packet or, (3) if the SFF is the exit/egress (e.g., egress node B 108 in FIG. 1), removes the NSH header and then, in cases 1 and 2, adds a new transport header. The transport header used may be different in different regions of the SFC domain. For example, a version of the Internet Protocol (IP) could be used in one part of the SFC domain and Multi-Protocol Label Switching (MPLS) could be used in another part of the SFC domain. In some embodiments, in cases where an SF is ignorant of, and would be confused by, the NSH header, an SF Proxy is used. The SF proxy receives the SFC packet from an SFF, strips out and remembers the NSH from that packet, forwards the packet without NSH to the SF, receives the packet back from the SF, re-affixes the NSH, and then returns the processed packet with NSH to the SFF. There are additional flexibilities in SFC as currently standardized by the IETF.

Figure 3:
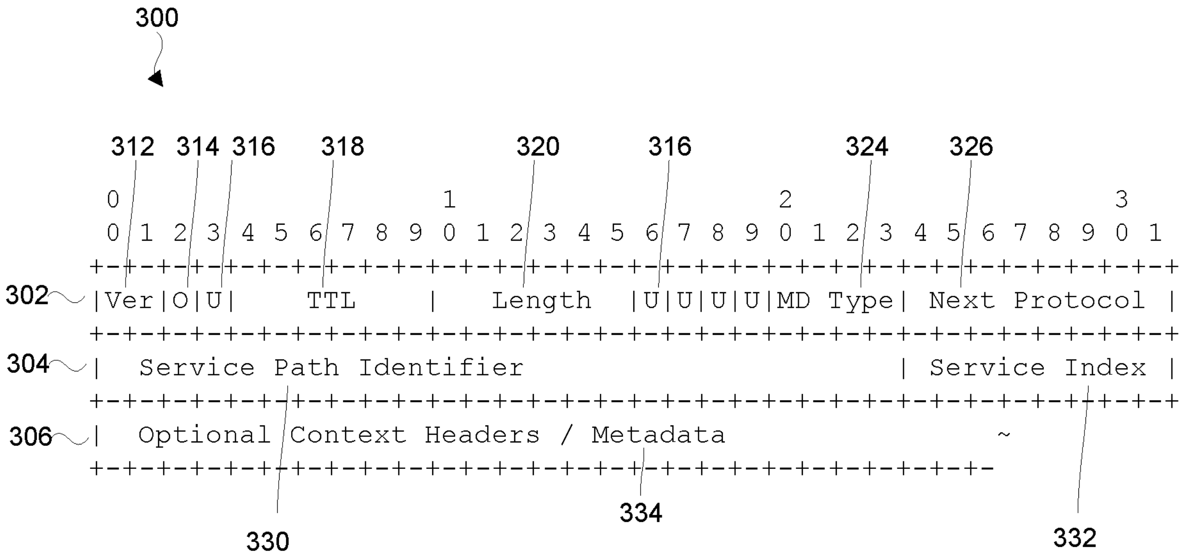
FIG. 3 illustrates an NSH in accordance with IETF RFC.

FIG. 3 illustrates an NSH 300 in accordance with IETF RFC 8300. The NSH 300 is an example of the NSH 204 in FIG. 2. The NSH 300 includes an initial 32-bit base header 302, a 32-bit service path header 304, and any context headers 306 holding metadata.

The base header 302 provides information about the service header and the payload protocol. The base header 302 includes a version field 312, an O bit field 314, one or more U-bit fields 316, a time-to-live (TTL) field 318, a length field 320, a MD type field 324, and a next protocol field 326. The version field 312 is used to ensure backward compatibility going forward with future NSH specification updates. For example, when a packet presumed to carry an NSH header is received at an SFF but the SFF does not understand the version of the protocol indicated in the base header, the packet is discarded and the event is logged. The O bit field 314 is used to indicate that the packet is an Operations, Administration, and Maintenance (OAM) packet. In an embodiment, the O bit field 314 is set to 1 when the packet is OAM packet and not set (e.g., set to 0) for non-OAM packets. The one or more U-bit fields 316 are unassigned and available for future use. The time-to-live (TTL) field 318 indicates the maximum SF visitations (hops) for an SFP. The TTL field 318 is the primary loop-prevention mechanism. Each SFF involved in forwarding an SFC packet decrements the TTL value by 1 prior to NSH forwarding lookup. The packet is not forwarded if TTL is, after decrement, 0. The length field 320 indicates the overall length of the NSH 300. The length of the metadata carried in the optional context headers 306 can be computed from the value in the length field 320 because the base header 302 and service path header 304 are fixed length. The MD type field 324 indicates the type or format of metadata in the NSH 300. In an embodiment, if the MD type field 324 has the value 1, there is a single fixed length 128-bit context header whose format is not further defined by the IETF. In that case, the length field 320 has the value 6. If the MD Type field has the value 2, there are zero or more variable-length context headers 306. The absence of any context headers 306 is indicated by using MD Type 2 and an NSH Length of 2 in the length field 320. MD Type 0 is reserved and MD Types 3 through 15 are unassigned. The next protocol field 326 indicates the protocol type of the encapsulated data.

The service path header 304 provides a path identification and location within a service path. The service path header 304 comprises a service path identifier (SPI) field 330 and a service index (SI) field 332. The SPI in the SPI field 330 identifies the logical path the packet should follow. The SI in the SI field 332 indicates which step along that path the packet is at (i.e., location within the SFP). The SI is used in conjunction with the SPI for determining the next SFF/SF in the path. An SF anywhere along a SFP can re-classify an SFC packet by replacing the SPI and SI in the NSH 300. SFFs can also insert, delete, or change metadata (optional context headers 306) in the NSH 300.

The optional context headers 306 carry metadata 334 (i.e., context data), if any, along a service path. The disclosed embodiments do not make any assumption about context headers that are mandatory to implement or those that are mandatory to process. These considerations are deployment specific.

Figure 4:
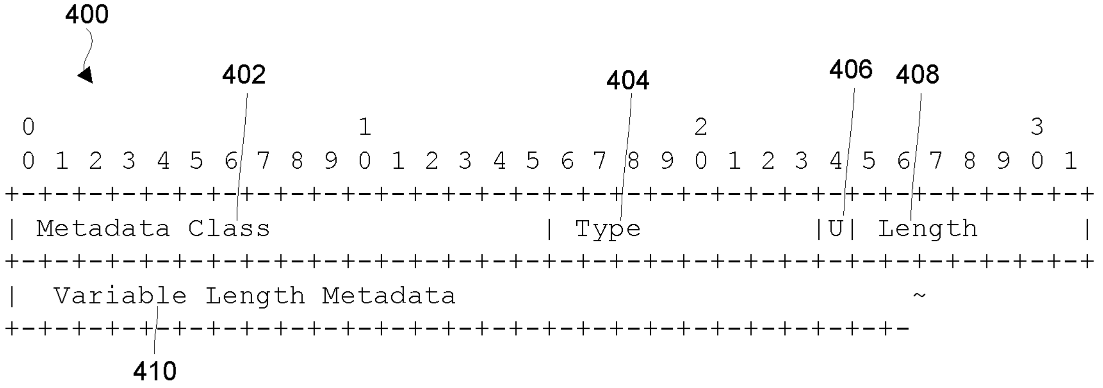
FIG. 4 illustrates a variable length context header (VLCH) according to an embodiment of the present disclosure.

FIG. 4 illustrates a variable length context header (VLCH) 400 according to an embodiment of the present disclosure. The VLCH 400 is an example of the optional context headers 306 of the NSH 300 in FIG. 3. In an embodiment, a minimum size of the VLCH 400 is 32 bits. The VLCH 400 comprises a metadata class field 402, a type field 404, one unused (U) bit 406, a length field 408, and a variable-length metadata field 410. The metadata class field 402 is 16 bits. The value of the metadata class field 402 specifies the organization under which the particular VLCH 400 is specified. For example, metadata class zero is the IETF base class. The type field 404 is 8-bits. The value of the type field 404 indicates the explicit type of metadata being carried. The length field 408 is 7 bits. The value of the length field 408 indicates the length in octets of the variable-length metadata in the variable-length metadata field 410. A value of 0 indicates that the VLCH 400 has no variable-length metadata. In an embodiment, the VLCH 400 is padded so that the VLCH 400 always starts and ends at a multiple of 4 bytes from the beginning of the NSH.

Figure 5:
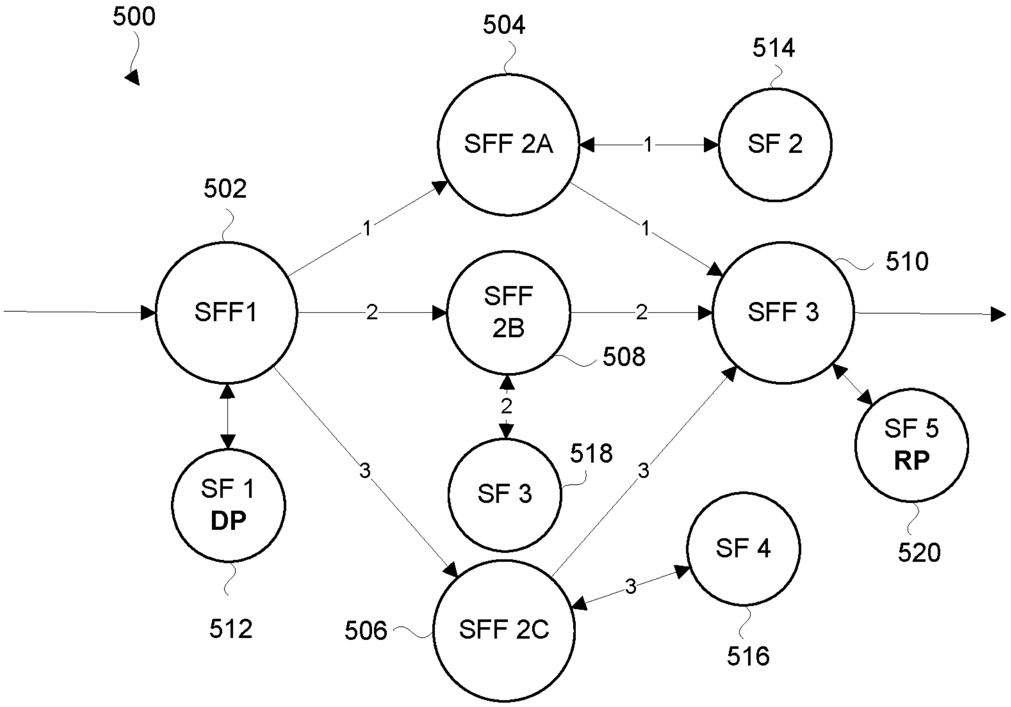
FIG. 5 illustrates an SFC domain having parallel service function paths according to an embodiment of the present disclosure.

FIG. 5 illustrates an SFC domain 500 having parallel service function paths according to an embodiment of the present disclosure. As used herein, the term parallel means not sequential. Parallel does not imply the multiple SFPs are the same or that the packets finish traversing the multiple SFPs at the same time. As shown in FIG. 5, a packet at SFF1 502 can be diverted to three different parallel SFPs (labeled 1, 2, and 3) and rejoined at SFF3 510. There are various reasons to split a SFC into two or more parallel SFPs. For example, there may be two or more SFs that can be performed in parallel with the goal being to delay the stream of packets only by the amount of time taken by the slowest single SF; if the packets went through the SFs sequentially, as provided in the current IETF SFC standard, the delay would be the sum of the times taken by each of the SFs. An example of such potential parallel processing might be that the SFs operate on different parts of the packet such as one SF operating on packet addressing, while another SF operates on the information payload. Another example might be that one SF creates a signature or integrity code over parts of the packet to be inserted into the packet payload, while another SF encrypts parts of the packet (or alternatively, they verify and decrypt in parallel).

Another example of desirable parallelism would be improved reliability or accuracy if the SFs executed in parallel were unreliable or were different implementations doing the same processing. For example, some quantum computers are currently unreliable. Therefore, it would be desirable to perform some quantum process several times and compare the results to pick the most common value. In an alternative, a vote could be taken between the results of different implementations of some process.

In the depicted embodiment, SFFs (e.g., SFF1 502 and SFF3 510) utilize one or more SFs as diversion points (DPs) and rendezvous points (RPs). A DP is an SF that implements a diversion function/process for enabling a packet to be transmitted to multiple parallel SFPs or rerouted to a different SFF (e.g., to splice in a new SFF to a SFP or slice out an existing SFF from an SFP). The diversion function/process may reclassify an SFC packet into one or multiple parallel packets with a different SPI where the reclassified packet or packets are, in the normal case, combined at a downstream RP which restores the original SPI. Downstream is the direction from ingress to egress (e.g., SFF3 510 is downstream from SFF1 502 in FIG. 5). An RP is an SF that implements a rendezvous process of taking one or more corresponding SFC packets that have been diverted at an upstream DP, combining the packets if there are more than one, and restoring the original SPI in the NSH.

As an example, in FIG. 5, SF1 512 is a DP and SF5 520 is a RP. As will be further described, SF1 512 may generate a copy of a SFC packet for each of the parallel SFPs (i.e., three copies of the SFC packet, one for each of the three parallel SFPs). SF1 512 then modifies each copy of the SFC packet so that each will be forwarded along one of the three parallel SFPs. SF1 512 also modifies each copy of the SFC packet to include merging information used by the RP to merge the diverted SFC packets. SF1 512 returns the modified SFC packets to the SFF1 502. SFF1 502 forwards a first modified SFC packet to SFF 2A 504 for parallel path 1, forwards a second modified SFC packet to SFF 2B 508 for parallel path 2, and forwards a third modified SFC packet to SFF 2C 506 for parallel path 3. In path 1, the SFF 2A 504 forwards the first modified SFC packet to a SF2 514 to perform some task. After the task is performed, which may further modify the first modified SFC packet, the SF2 514 may return (e.g., if not discarded) the first modified SFC packet to the SFF 2A 504. SFF 2A 504 transmits the first modified SFC packet to SFF3 510. SFF3 510 forwards/transmits the first modified SFC packet to SF5 520. In path 2, the SFF 2B 508 forwards the second modified SFC packet to a SF3 518 to perform some task. After the task is performed, the SF3 518 may return the second modified SFC packet to the SFF 2B 508. SFF 2B 508 transmits the second modified SFC packet to SFF3 510. SFF3 510 forwards the second modified SFC packet to SF5 520. Similarly, in path 3, the SFF 2C 506 forwards the third modified SFC packet to a SF4 516 to perform some task. After the task is performed, the SF4 516 may return the third modified SFC packet to the SFF 2C 506. SFF 2C 506 transmits the third modified SFC packet to SFF3 510. SFF3 510 forwards the third modified SFC packet to SF5 520. SF5 520 uses the merging information in the corresponding modified SFC packets to merge the first modified SFC packet, the second modified SFC packet, and the third modified SFC packet to single SFC packet based on the modified data in first, second, and third modified SFC packets. In an embodiment, the SF5 520 restores the original SPI (i.e., the SPI in the SFC packet that was copied at SF1 512) in the NSH of the merged SFC packet. The SF5 520 returns/transmits the merged SFC packet back to the SFF3 510. The SFF3 510 processes the merged SFC packet as normal.

In FIG. 5, in some embodiments, one of the three parallel paths shown going through SFFs 2A, 2B, and 2C uses the same SPI as is used in the SFP before the parallel paths split and after the parallel paths join. Alternatively, all the parallel paths could use different SPIs that are also different from the SPI before or after the area of parallelism. In accordance with the disclosed embodiments, any of the parallel paths could have more than one SFF, although only one is shown in the example for simplicity, and any of the SFFs in any of the parallel SFPs could process a packet through more than one SF, although they are shown using only one SF in FIG. 5 for simplicity. There could be more or fewer parallel paths than the three shown in FIG. 5. In some embodiments, one or more of the parallel paths would themselves further split into parallel paths and so on. Such subsidiary parallel paths resulting from such a split might converge at the original RP or might converge at a RP later in the path that had been further split into parallel paths. It should be noted, that although FIG. 5 depicts a DP and a RP as being separate from an SFF, in some embodiments, a SFF can incorporate the functions of a DP or a RP.

Figure 6:
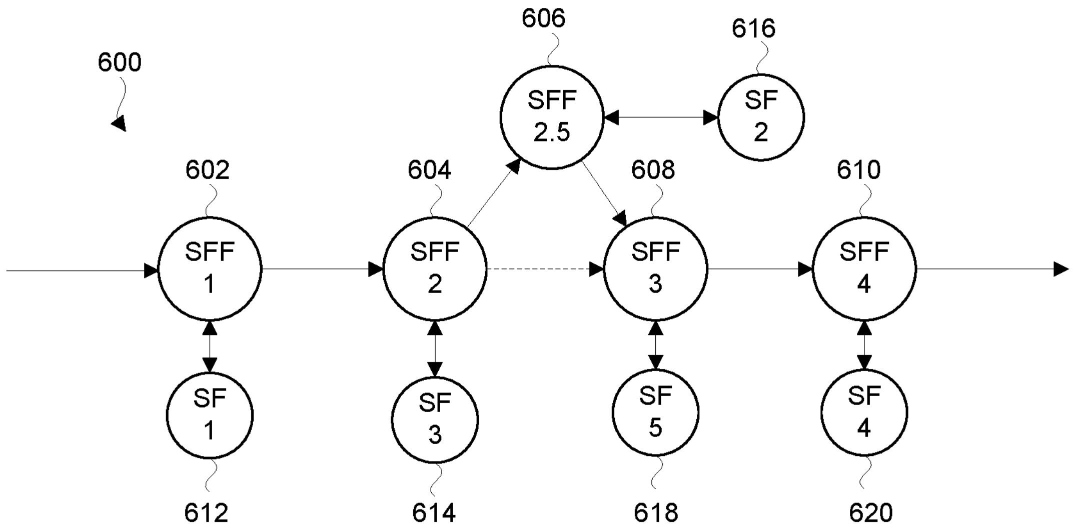
FIG. 6 illustrates a SFF being spliced into a SFP according to an embodiment of the present disclosure.

In addition to parallel SFPs, there may also be cases where it is desirable to divert or reroute an SFP so as to splice one or more added SFFs into the SFP or to slice out one or more sequential SFFs that are in the SFP. For instance, FIG. 6 illustrates an SFF being spliced into a SFP 600 according to an embodiment of the present disclosure. In the depicted embodiment, SFP 600 normally processes a SFC packet through SFF1 602, SFF2 604, SFF3 608, SFF4 610, and their corresponding SFs. For example, an SFC packet may be transmitted from SFF1 602 to SF1 612 serviced at SF1 612, and then returned to SFF1 602, which forwards the SFC packet to SFF2 604. SFF2 604 transmits the SFC packet to SF3 614, which performs some function and returns the SFC packet to SFF2 604. SFF2 604 forwards the SFC packet to SFF3 608. SFF3 608 transmits the SFC packet to SF5 618, which performs some function and returns the SFC packet to SFF3 608. SFF2 608 forwards the SFC packet to SFF3 610. SFF4 610 transmits the SFC packet to SF4 620, which performs some function and returns the SFC packet to SFF4 610.

As shown in FIG. 6, an SFF2.5 606 is spliced in between SFF2 604 and SFF3 608. In this case, SF3 614 could be configured as a DP that modifies a SFC packet to enable rerouting of the SFC packet. In an embodiment, the SF3 614 modifies an SI in an NSH of the SFC packet to reroute the SFC packet to SFF2.5 606. The SF3 614 returns the modified SFC packet to SFF2 604, which forwards the SFC packet to SFF2.5 606. SFF2.5 606 transmits the SFC packet to SF2 616 to perform some function. Thereafter, SF2 616 returns the SFC packet to SFF2.5 606. SFF2.5 606 then forwards the SFC packet to SFF3 608, and the normal SFP resumes.

Figure 7:
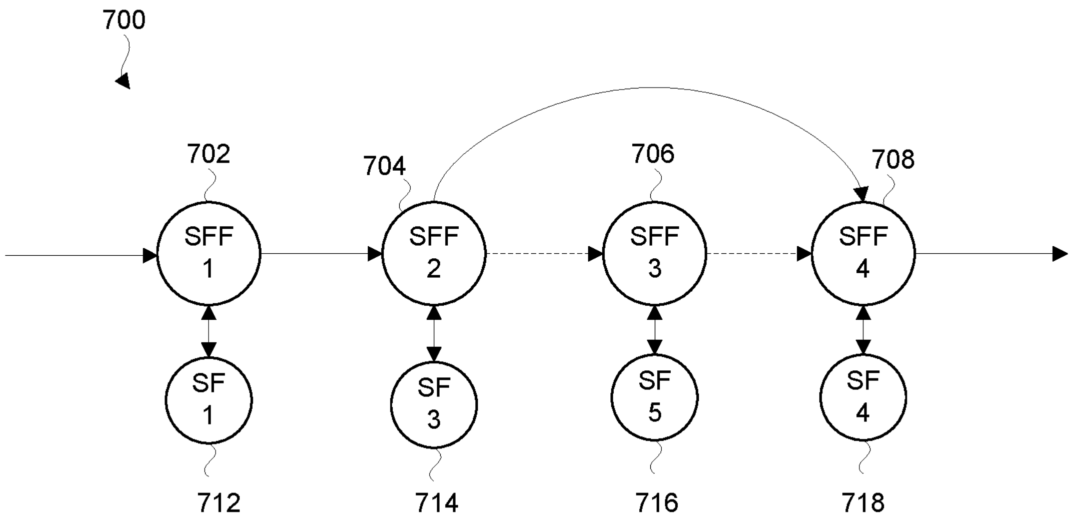
FIG. 7 illustrates an SFF being spliced out of an SFP according to an embodiment of the present disclosure.

FIG. 7 illustrates a SFF being spliced out of an SFP 700 according to an embodiment of the present disclosure. In the depicted embodiment, SFP 700 normally processes an SFC packet through SFF1 702, SFF2 704, SFF3 706, and SFF4 708. For example, an SFC packet may go from SFF1 702 to SF1 712 to perform some function on the SFC packet. SF1 712 returns the SFC packet to SFF1 702, which forwards the SFC packet to SFF2 704. SFF2 704 transmits the SFC packet to SF3 714, which performs some function and returns the SFC packet to SFF2 704. SFF2 704 forwards the SFC packet to SFF3 706. SFF3 706 transmits the SFC packet to SF5 716, which performs some function and returns the SFC packet to SFF3 706. SFF3 706 forwards the SFC packet to SFF4 708. SFF4 708 transmits the SFC packet to SF4 718, which performs some function and returns the SFC packet to SFF4 708.

As shown in FIG. 7, suppose SFF3 706 is to be sliced out or removed from the SFP 700 for certain SFC packets. In this case, SF3 714 could be configured as a DP that modifies an SFC packet to enable rerouting of the SFC packet from SFF2 704 to SFF4 708, skipping SFF3 706. In an embodiment, the SF3 714 decreases an SI in an NSH of the SFC packet to that of the desired SF (e.g., SF 718 in FIG. 7). The SF3 714 returns the modified SFC packet to SFF2 704. SFF2 704 is configured to recognize the reduced SI value in the modified SFC packet and forward the modified SFC packet to the appropriate SFF, which is SFF4 708 in this example.

In some embodiments, SFF2 604 and SFF2 704 in FIG. 6 and FIG. 7 could re-classify the packet with a new NSH that includes the remainder of the new diverted path. To accomplish this, a new SFP with this new SPI would already have to be configured in all the SFFs for the remainder of the SFP after a diversion. In the case of FIG. 7, SFF2 704 could possibly just adjust the SI, and SFF4 708 would be configured to either know that the packet is coming from SFF2 704 when checking the source address or SFF4 708 would have to relax/pause/stop checking of the source address of packets on the main SFP.

The cases shown in FIG. 6 and FIG. 7 may also have an RP, at SFF3 608 and SFF4 708 respectively, like the RP in FIG. 5 (SFF5 520) where the diversion rejoins the main SFP.

Additionally, in some embodiments, combinations of the cases shown in FIGS. 5, 6, and 7 may be needed where a diversion such as in FIG. 6 or FIG. 7 occurs within a parallel path as in FIG. 5 or parallel paths as in FIG. 5 occur within a diversion as in FIG. 6.

To recombine packets from divergent SFP(s) at an RP as described in FIG. 5, or rejoin a diverted SFP to the original SFP as described in FIG. 6, additional information may be needed in the packets (i.e., merging information for merging the plurality of diverted SFC packets). In an embodiment the merging information may be included in a rendezvous point information (RePIn) data structure such as that described in FIG. 8.

Figure 8:
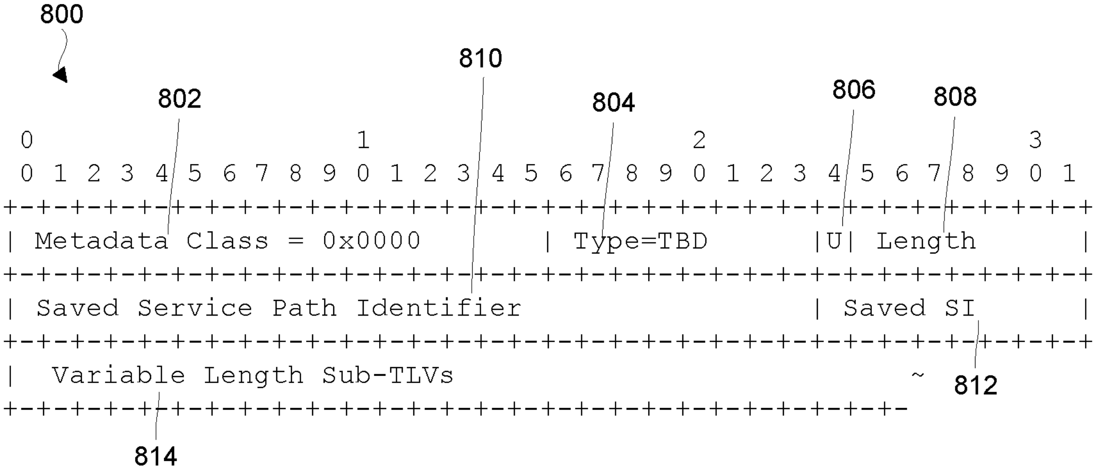
FIG. 8 illustrates a RePIn VLCH according to an embodiment of the present disclosure.

FIG. 8 illustrates an RePIn Variable-Length Context Header (VLCH) 800 according to an embodiment of the present disclosure. In an embodiment, the RePIn VLCH 800 is used by a DP (e.g., SF1 512 in FIG. 5) to add merging information in the NSH (e.g., NSH 300 in FIG. 3) of diverted SFC packets for enabling an RP (e.g., SF5 520 in FIG. 5) to merge the diverted SFC packets. The RePIn VLCH 800 comprises a metadata class field 802, a type field 804, one unused (U) bit 806, a length field 808, a saved service path identifier field 810, a saved SI field 812, and a variable length sub-TLVs field 814. The metadata class field 802 is the same as the metadata class field 402 for the VLCH 400 in FIG. 4. In an embodiment, the value in the metadata class field is zero. The value (to be determined (TBD)) of the type field 804 indicates the explicit type of metadata being carried. The U bit 806 is reserved for later use. The length field 808 is the total length of the variable length sub-TLVs field 814 in octets.

In an embodiment, the saved service path identifier field 810 and saved SI field 812 are the SPI and SI, respectively, in the NSH of the SFC packet being diverted after entry to the DP SF and after the SI has been decremented. The variable length sub-TLVs field 814 comprises zero or more RePIn VLCH Sub-TLVs as described below in FIG. 9 and FIG. 10. In an embodiment, all RePIn VLCH sub-TLVs are padded at the end up to an even multiple of 4 octets.

FIG. 9 illustrates an RePIn VLCH sub-TLV 900 according to an embodiment of the present disclosure. The RePIn VLCH sub-TLV 900 is an example of VLCH Sub-TLVs that can be used to provide merging information in the NSH of a diverted SFC packet and that can be added in the variable length sub-TLVs field 814 of the RePIn VLCH 800 in FIG. 8. The RePIn VLCH sub-TL V 900 includes a sub-type field 902, an X bit field 904, a sub-length field 906, and a variable length metadata field 908. The sub-type field 902 is an 8-bit unsigned integer that is always present and indicates the format of the rest of the RePIn VLCH sub-TLV 900. The X bit field 904 may be assigned a meaning for particular sub-types. In an embodiment, if no such meaning is assigned for a particular sub-type, the X bit field 904 is set to zero and ignored on receipt. The sub-length field 906 is an unsigned integer indicating the length of the variable length metadata field 908 in octets. In an embodiment, unless the specification for a sub-type of the RePIn VLCH sub-TLV 900 specifies that there may be multiple occurrences of that sub-TLV, the RePIn VLCH sub-TLV 900 may only be included once in the RePIn VLCH 800. In an embodiment, if there are multiple instances of the RePIn VLCH sub-TLV 900, the first occurrence of the RePIn VLCH sub-TLV 900 is used with any subsequent occurrences being ignored.

FIG. 10 illustrates a packet identifier special sub-TLV 1000 according to an embodiment of the present disclosure. The packet identifier special sub-TLV 1000 includes a sub-type field 1002 and a packet identifier field 1004. In an embodiment, the sub-type field 1002 has a value of 1 assigned to the packet identifier special sub-TLV type (i.e., indicates that the sub-TLV is a packet identifier special sub-TLV). The packet identifier special sub-TLV 1000 is an example of VLCH sub-TLVs that can be used to provide merging information in the NSH of a diverted SFC packet and added in the variable length sub-TLVs field 814 of the RePIn VLCH 800 in FIG. 8. In an embodiment, the packet identifier special sub-TLV 1000 is used to provide packet identifiers in the packet identifier field 1004. The packet identifiers enable an RP to identify the diverted packets for merging. For example, a DP may use the packet identifier special sub-TLV 1000 to label each copy of the original packet with a packet identifier prior to the split. The packet identifier may be, for example, a packet counter, fine grained time stamp, or hash code. In some embodiments, the packet identifier might already exist in the packet, for example a Transmission Control Protocol (TCP) sequence number. If no such packet identifier exists, a packet identifier (e.g., a packet counter) can be included in the NSH of a SFC packet using the packet identifier special sub-TLV 1000. In the depicted embodiment, because the packet identifier special sub-TLV 1000 is expected to be a common RePIn VLCH sub-TLV, in order to save octets, for this sub-type only, the X and sub-length fields (e.g., X bit field 904 and sub-length field 906 of the RePIn VLCH sub-TLV 900 in FIG. 9) are subsumed into the packet identifier field 1004.

FIG. 11 illustrates a packet extent modified sub-TLV 1100 according to an embodiment of the present disclosure. The packet extent modified sub-TLV 1100 is an example of a variable length sub-TLV that can be included in the RePIn VLCH 800 in FIG. 8 to provide additional information for merging diverted SFC packets at a RP. In particular, if two or more SFPs used in parallel have modified parts of a packet, the RP may need additional information to be able to recombine the different copies of the packet it will be receiving. As an example of the complexities involved, an SF could change the length of part of a packet in a way dependent on the content of that part. For example, the SF could change the length of part of the packet by applying a data compression or de-compression algorithm to part of the packet or by conditionally inserting or removing a virtual LAN (VLAN) tag depending on addressing information. In simple cases such as parallel SFPs that modify fixed-size disjoint parts of a packet without changing the size of those parts, it may be possible for a RP to be configured to recombine the results without added information. But in more complex or variable length cases, parallel SFPs need to add information as to what part of the original packet they modified and how this may have changed the length of that part. Also, with such additional information, in some cases, only one of the parallel SFPs would need to forward all of the original packet with modifications to the RP. One or more other parallel SFPs could just forward their modified part and the RP would be able to recombine the results, thus saving communications link capacity that would be used if the SFPs all sent full packets.

In the depicted embodiment, the packet extent modified sub-TLV 1100 includes a sub-type field 1102, a X bit field 1104, a sub-length field 1106, an offset field 1108, a priority field 1110, an original size field 1112, and a modified size field 1114. In an embodiment, the sub-type field 1102 is an 8-bit unsigned integer that has a value 2, which is assigned to the packet extent modified sub-TLV type. The X bit field 1104 may be used to indicate whether the entire modified packet is present or whether only the modified portion appears in the packet. For example, if the X bit is zero, the entire modified packet is present in the SFC packet. If the X bit is a one, only the modified portion appears in the packet. When the modified portion appears in the packet, any SFs between the SF that modified the packet and the RP have to be capable of handling such an abbreviated packet. The sub-length field 1106 has a value of 6, which indicates the length of the remainder of the packet extent modified sub-TLV 1100 in octets following the sub-length field 1106. The offset field 1108 provides an Offset, which is the number of bits between the end of the NSH or the last NSH if there are multiple stacked NSHs and the portion of the packet being modified. The priority field 1110 may be used to indicate a priority between SFC packets that have modified the same or overlapping parts of a packet. For example, if parallel SFPs have modified the same or overlapping parts of a packet, the RP may need some way to resolve this conflict, which could include a relative priority for changes made by different SFs configured at the RP and/or indicated in the RP Information (RePIn) or from other sources. In an embodiment, the priority field 1110 contains an unsigned integer where a larger magnitude value indicates a higher priority that would prevail over a lower priority. If not used, the priority field 1110 can be set to zero and ignored on receipt. The original size field 1112 and a modified size field 1114 are the size in bits of the portion being modified before and after that modification. Any of the offset field 1108, original size field 1112, and modified size field 1114 may have the value zero. If a path has modified more than one portion of a packet, multiple instance of the packet extent modified sub-TLV 1100 can be included in the RePIn VLCH 800.

FIG. 12 illustrates a saved metadata sub-TLV 1200 according to an embodiment of the present disclosure. The saved metadata sub-TLV 1200 is an example of a variable length sub-TLVs that can be included in the RePIn VLCH 800 in FIG. 8 to provide additional information for merging diverted SFC packets at a RP. In particular, a DP may use the saved metadata sub-TLV 1200 to save metadata so the metadata is hidden inside a diversion path and so the metadata can be restored at the RP.

In the depicted embodiment, the saved metadata sub-TLV 1200 includes a sub-type field 1202, a X bit field 1204, a sub-length field 1206, a Must-Be-Zero (MBZ) field 1208, a metatype field 1210, and a variable length saved metadata field 1212. In an embodiment, the sub-type field 1202 is an 8-bit unsigned integer that has a value 3 assigned to the saved metadata sub-TLV type. In an embodiment, the X bit field 1204 and MBZ field 1208 are set to zero and ignored on receipt. The presence of the MBZ field 1208 causes the saved metadata to be aligned on a multiple of 4 octets. The sub-length field 1206 is an unsigned integer indicating the length of the variable length saved metadata field 1212 in octets. The metatype field 1210 indicates the MD Type of Metadata saved. The variable length saved metadata field 1212 contains the saved metadata.

FIG. 13 illustrates a saved TTL sub-TLV 1300 according to an embodiment of the present disclosure. The saved TTL sub-TLV 1300 is an example of a variable length sub-TLVs that can be included in the RePIn VLCH 800 in FIG. 8 to provide additional information for merging diverted SFC packets at a RP. In particular, a DP may use the saved TTL sub-TLV 1300 to save a TTL value of the original packet prior to diversion so the TTL can be restored at the RP. The TTL limits the number of SFs visitations between ingress and egress. The packet is discarded if the TTL is exhausted. This is a safety measure to defend against infinite or very large loops due to malfunctions, configuration error, or other reasons. Note that resetting the TTL on entry to a diversion opens the possibility for a loop where a diversion diverts to itself or where there are two diversions X and Y, where X diverts to Y and Y diverts to X. More complex scenarios are also possible. However, all of these scenarios are made safe by using a continuous TTL. Such loops will result in a growing amount of metadata which might safely lead to packet discard or unsafely cause repeated fragmentation. Thus, the recommended mode of operation is to use a TTL value that is decremented continuously from original SFC domain ingress to final SFC egress including throughout any diversions. If the TTL is reset on entry to a diversion, then the saved TTL sub-TLV 1300 can be used so that the previous TTL can be restored at the diversion's RP.

In the depicted embodiment, the saved TTL sub-TLV 1300 includes a sub-type field 1302, a X bit field 1304, a sub-length field 1306, a MBZ field 1308, and a saved TTL field 1310. In an embodiment, the sub-type field 1302 is an 8-bit unsigned integer that has a value 4 assigned to the saved TTL sub-TLV type. The sub-length field 1306 is 2, which indicates the length of the remainder of the saved TTL sub-TLV 1300 in octets following the sub-length field 1306. In an embodiment, the X bit field 1304 and MBZ field 1308 are set to zero and ignored on receipt. The presence of the MBZ field 1308 causes the saved TTL field 1310 to be aligned on a multiple of 4 octets. The saved TTL field 1310 stores the original/previous TTL prior to diversion so the previous TTL can be restored at the RP.

Figure 14:
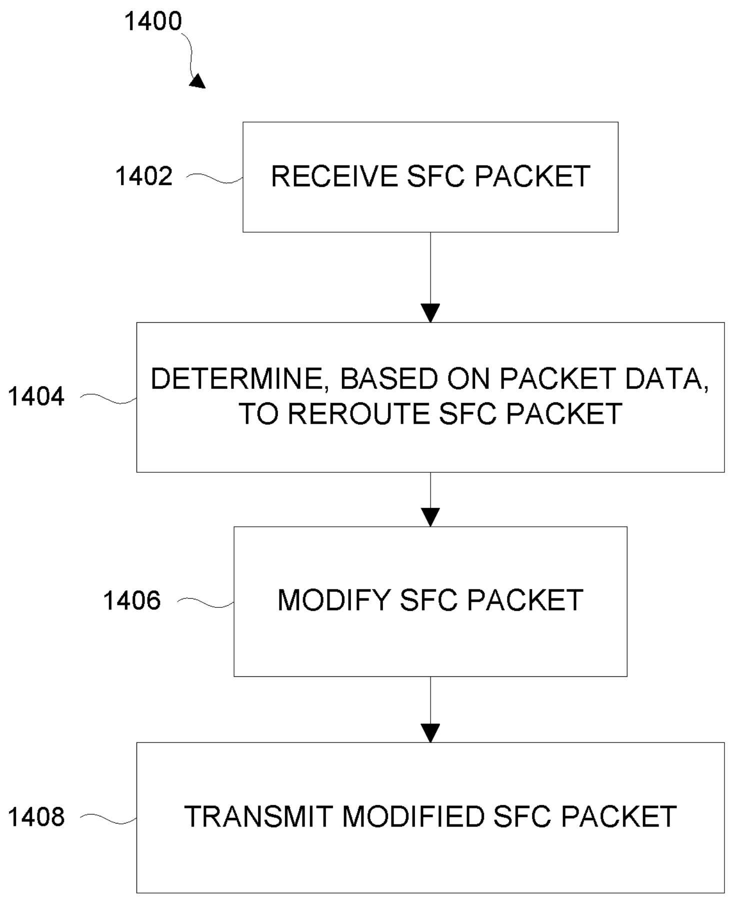
FIG. 14 is a flowchart illustrating a SFC diversion process according to an embodiment of the present disclosure.

FIG. 14 is a flowchart illustrating an SFC diversion process 1400 according to an embodiment of the present disclosure. The SFC diversion process 1400 may be executed by a node at a DP in an SFC. For example, the SFC diversion process 1400 may be executed by SF3 614 in FIG. 6 or SF3 714 in FIG. 7. The node receives an SFC packet at step 1402. At step 1404, the node determines, based on packet data, that the SFC packet is to be rerouted from a first SFF of the SFC to a second SFF of the SFC. For example, the node may determine to divert SFC packets of a particular packet flow based on the SPI and SI values in the SFC packets. In some embodiments, a node may examine the content of the SFC packet, not just the SPI and SI, to determine if the SFC packet should be diverted. The second SFF may be a new SFF added to the SFC (e.g., inserting in a new SFF) or may be an existing SFF along a SFP of the SFC packet (e.g., slicing out a SFF from the SFP). The node, at step 1406, generates a modified SFC packet by modifying a SI in a NSH of the SFC packet to reroute the SFC packet to the second SFF. At step 1408, the node forwards the modified SFC packet. If the node is a separate node or SF from an SFF, the node forwards or returns the SFC packet back to the SFF that the SFC packet was received from. However, if the node/SF is incorporated with or also configured as a SFF, the node forwards the modified SFC packet directly to the second SFF (i.e., the SFF that the SFC packet is being diverted to). In some embodiments, if it is desired to simply skip some SFs in an SFP, a diversion may not be necessary. The node can simply decrease the SI to that for the next SF desired if the SFF to which the node returns the SFC packet can handle the reduced SI value and forward the packet to the appropriate SFF.

Figure 15:
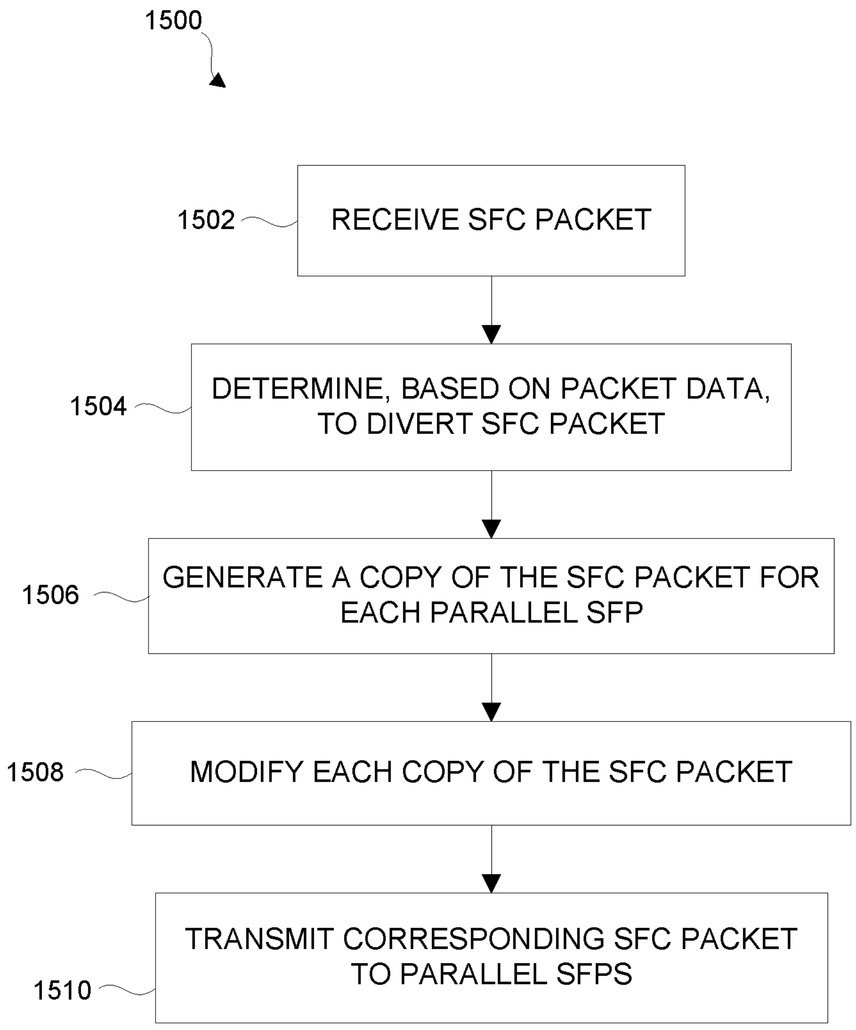
FIG. 15 is a flowchart illustrating a SFC multi-path diversion process according to an embodiment of the present disclosure.

FIG. 15 is a flowchart illustrating a SFC multi-path diversion process 1500 according to an embodiment of the present disclosure. The SFC multi-path diversion process 1500 may be executed by a node at a DP in an SFC. For example, the SFC multi-path diversion process 1500 may be executed by SF1 512 in FIG. 5. The node receives a SFC packet at step 1502. In an embodiment, the SFC packet is received from an SFF. At step 1504, the node determines, based on packet data, that the SFC packet is to be diverted to multiple parallel SFPs of the SFC. For example, the node may determine to divert SFC packets of a particular packet flow based on the SPI and SI values, or other values, in the SFC packets in the packets, or based on the content of the SFC packet.

At step 1506, the node generates a copy of the SFC packet for each of the parallel SFPs. The node, at step 1508, modifies each copy of the SFC packet so that one copy of the SFC packet will be forwarded per parallel SFP. The node may also modify a SPI and/or a SI in the NSH in each of the SFC packets to a SPI/SI corresponding to a RP. Additionally, the node includes merging information in the SFC packets to enable merging of the diverted SFC packets at the RP. In a particular embodiment, the node constructs and inserts a RePIn data structure (e.g., RcPIn VLCH 800 in FIG. 8) into the NSH of each of the SFC packets that contains the merging information. For example, the RePIn data structure may include SPI and SI values of the original SFC packet (i.e., before being diverted), packet identification information for identifying the SFC packets to merge (e.g., using packet identifier special sub-TLV 1000 in FIG. 10), packet extent information for indicating which parts of a SFC packet were modified along a particular parallel SFP (e.g., using packet extent modified sub-TLV 1100 in FIG. 11), packet priority information in case of conflicting changes (e.g., using packet extent modified sub-TLV 1100 in FIG. 11), saved metadata (e.g., using saved metadata sub-TLV 1200 in FIG. 12), saved TTL (e.g., using saved TTL sub-TLV 1300 in FIG. 13), or any other information for merging the SFC packets from the parallel SFPs.

In some embodiments, if there is an existing RePIn data structure in the NSH (e.g., when a diversion occurs from an earlier diversion), the new RePIn data structure may be inserted into the NSH according to the following rules:

If the initial NSH in the SFC packet is MD Type 2, insert the RePIn data structure before any existing RePIn data structure in the NSH.

If the initial NSH in the SFC packet is MD Type 1, this implies that there is Type 1 metadata that may be needed by one or more SFs in the diversion. If the SFs in the diversion can handle stacked NSHs, insert a MD Type 2 NSH copied from the initial NSH except for metadata, after the initial MD Type 1 NSH to hold the RePIn data structure. Handling stacks NSHs means the SF (or its proxy) can parse through them to find the needed metadata and the payload to operate on and, if the SF generates packets, can create them with appropriate stacked NSHs.

At step 1510, the node transmits the SFC packets to a corresponding SFF for each of the parallel SFPs. In some embodiments, prior to transmitting the SFC packets, the node may set a new TTL for one or more of the SFC packets to limit looping of a SFC packet in a parallel SFP. The original TTL may be saved and restored at RP. The node may also remove any unnecessary saved metadata or other data from one or more of the SFC packets to reduce the packet carrying load of the parallel SFPs (e.g., if certain data in a first SFC packet is not used in a parallel SFP and that data is in another SFC packet, the data can be removed from the first SFC packet because it will be available in the other SFC packet at the RP). The node may also perform any other functions or modifications to the metadata or other parts of the SFC packet as are appropriate based on the saved or new SPI or other factors.

Figure 16:
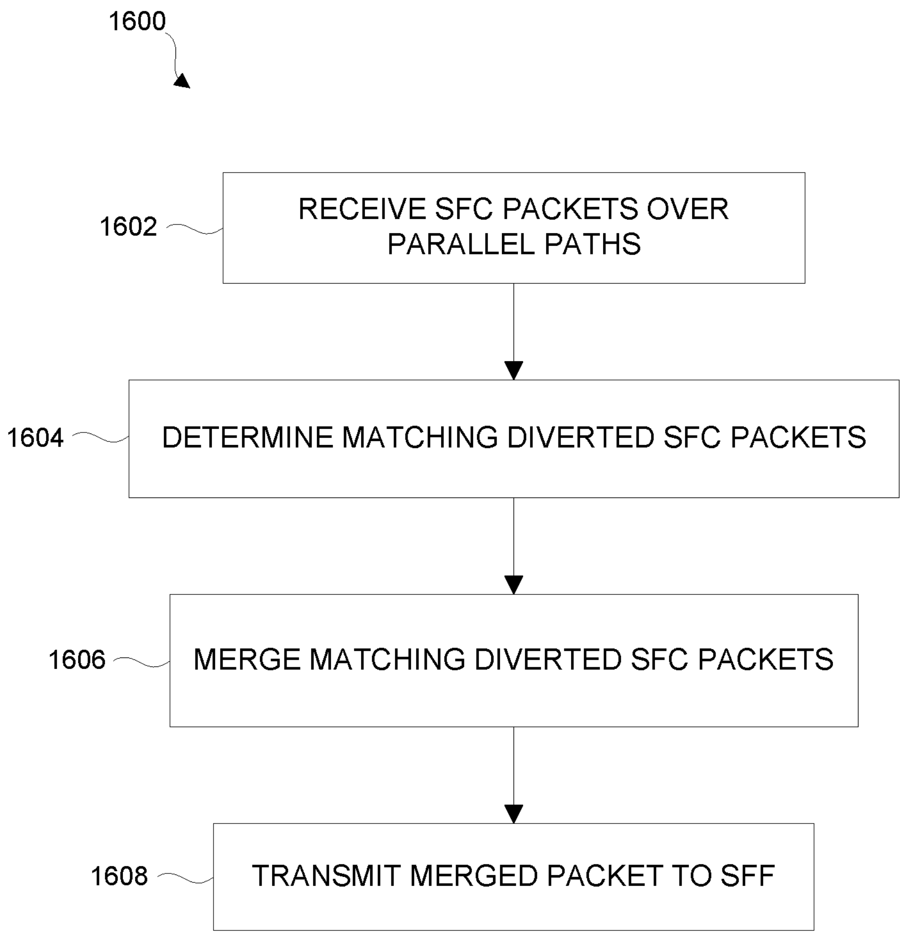
FIG. 16 is a flowchart illustrating a SFC merging process according to an embodiment of the present disclosure.

FIG. 16 is a flowchart illustrating a SFC merging process 1600 according to an embodiment of the present disclosure. The SFC merging process 1600 may be executed by a node at a RP in an SFC. For example, the SFC merging process 1600 may be executed by SF5 520 in FIG. 5. In an embodiment, the node is configured to know the SFC packet SPI and SI values in diverted packets for which it is to perform the RP service. The SI is decremented when a SFC packet is received by a SF; for a RP this might decrement the SI to zero.

The node, at step 1602, receives a plurality of diverted SFC packets over parallel paths. In an embodiment, the node buffers (i.e., stores in a temporary memory location) matching diverted SFC packets until all of the diverted matching SFC packets in the set of matching diverted SFC packets are received. In an embodiment, overflow of such a buffer will result in lost packets and should be logged as an error. In an embodiment, how long to wait for missing diverted packets and what action to take if it is decided they have been lost are application are implementation dependent.

The node, at step 1604, determines a set of matching diverted SFC packets from the plurality of diverted SFC packets. If possible, the node may determine the set of matching diverted SFC packets without the use of the RePIn data structure. If not possible, the node extracts merging information (e.g., information contained in a RePIn data structure) from each diverted SFC packet in the set of matching diverted SFC packets. In an embodiment, the node finds and removes the first RePIn data structure in the diverted packet (e.g., the RePIn data structure might be in a second stacked NSH if the initial NSH has MD Type 1.) The node uses the extracted merging information (e.g., packet identification information) to determine the set of matching diverted SFC packets.

At step 1606, the node merges the set of matching diverted SFC packets into a merged SFC packet.

In an embodiment, if possible, the node restores the diverted SFC packets to their former SFP and, to the extent necessary, match and merge diverted packets received over parallel paths and correctly order the resulting SFC packets without the presence of a RePIn data structure. Otherwise, the node uses the extracted merging information from the RePIn data structure to merge the set of matching diverted SFC packets into a merged SFC packet.

In an embodiment, the node may select of the matching diverted SFC packets in the set of matching diverted SFC packets to modify into the merged SFC packet (i.e., changes from other diverted SFC packets are incorporated into the selected diverted SFC packet). The selection of the packet may be arbitrarily unless the node is configured to select a particular packet (e.g., from a particular diverted path, based on priority, based on packet size, number of modifications in a packet, or other selection factors). The node merges a payload in each matching diverted SFC packet into the merged SFC packet. If there is a saved TTL in the extracted merging information, the node restores the saved TTL into the initial NSH. In an embodiment, if there is not a saved TTL, the node may restore a minimum TTL selected from the set of matching diverted SFC packets to the initial NSH of the merged SFC packet. Additionally, the node restores a saved SPI and a saved SI from a diverted SFC to the initial NSH of the merged SFC packet.

The node may also restore saved metadata from a diverted SFC packet to the initial NSH of the merged SFC packet. In an embodiment, the node restores metadata according to the following rules: (1) restore any MD type 2 saved metadata from the extracted merging information into the NSH from which that merging information was extracted, (2) if there is MD Type 1 saved metadata in the extracted merging information and there is an initial MD Type 1 NSH in the packet, replace the MD Type 1 metadata with the saved MD Type 1 metadata, (3) if there is MD Type 1 saved metadata in the extracted merging information and there is an initial MD Type 2 NSH in the packet, insert a new initial NSH into the packet, the new initial NSH is a copy of that MD Type 2 NSH except that it is MD Type 1 with the saved MD Type 1 metadata, and (4) if, at this point, the packet starts with a MD Type 1 NSH followed by a MD Type 2 NSH with no metadata, remove that 2nd NSH. Depending on the application and implementation, the remaining metadata in the merged packet may be used or updated based on the remaining metadata in the other packets being merged.

In an embodiment, for error checking, the node compares the saved SPI and SI in an initial NSH in each matching diverted SFC packet in the set of matching diverted SFC packets. If the saved SPI and SI values do not match the corresponding saved SPI and SI values for all matching diverted SFC packets, the node may generate an error (e.g., log error in error log).

The node may perform such other functions or modifications to the metadata or other parts of the SFC packet as are appropriate based on the saved or new SPI or other factors.

At step 1608, the node returns or transmits the merged packet to an SFF.

Figure 17:
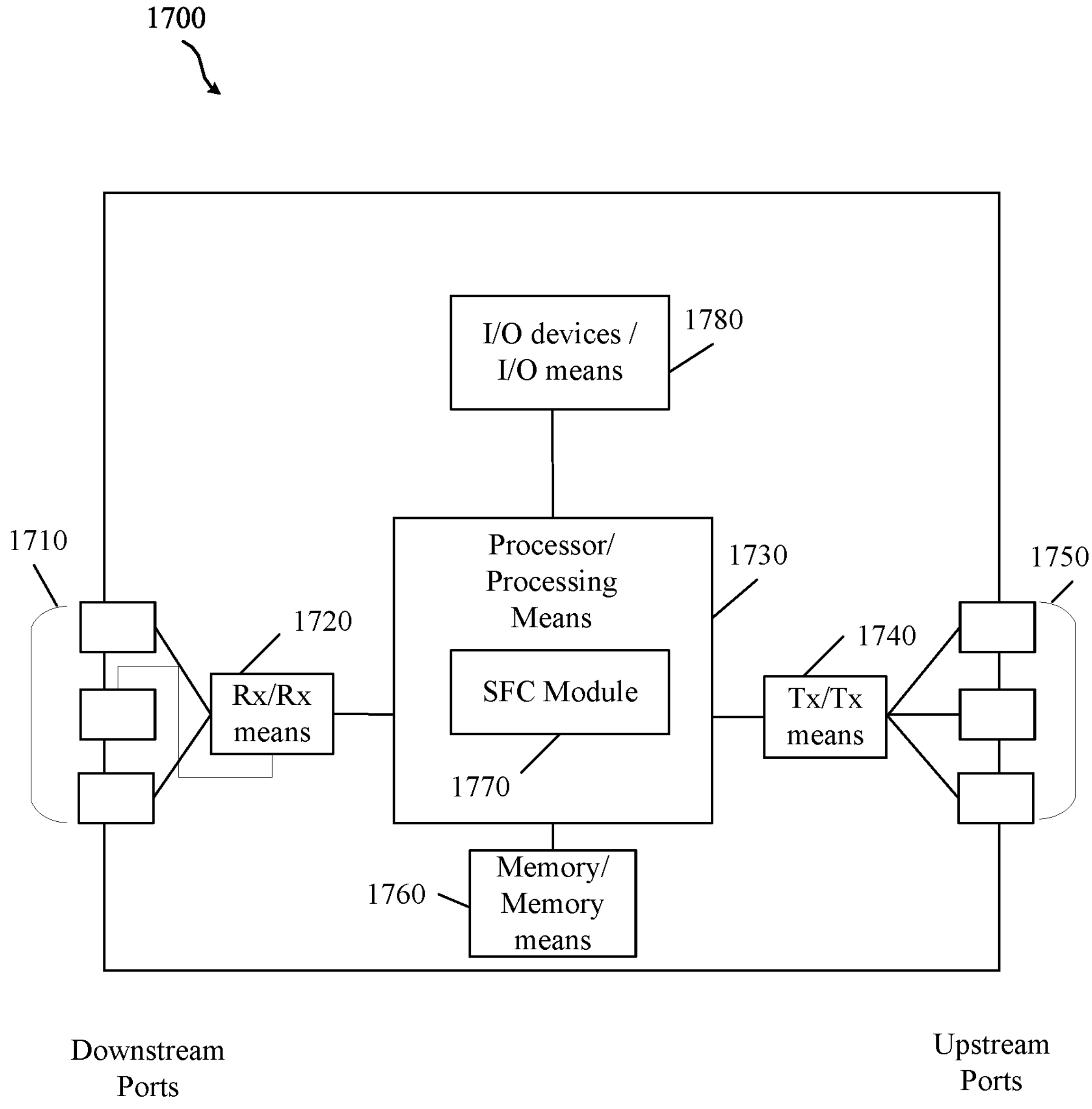
FIG. 17 is a schematic diagram of a node according to an embodiment of the disclosure.

FIG. 17 is a schematic diagram of a node 1700 according to an embodiment of the disclosure. The node 1700 is suitable for implementing the disclosed embodiments as described herein. In an embodiment, the node 1700 may be a SF node, a SFF node, or another device configured to perform the disclosed embodiments. For example, the node 1700 may be used to implement a DP or a RP as disclosed herein.

The node 1700 comprises ingress ports 1710 (or input ports 1710) and receiver units (Rx) 1720 for receiving data; a processor, logic unit, or central processing unit (CPU) 1730 to process the data; transmitter units (Tx) 1740 and egress ports 1750 (or output ports 1750) for transmitting the data; and a memory 1760 for storing the data. The node 1700 may also comprise optical-to-electrical (OE) components and electrical-to-optical (EO) components coupled to the ingress ports 1710, the receiver units 1720, the transmitter units 1740, and the egress ports 1750 for egress or ingress of optical or electrical signals. The processor 1730 may be implemented as one or more CPU chips, cores (e.g., as a multi-core processor), field-programmable gate arrays (FPGAs), application-specific integrated circuits (ASICs), and digital signal processors (DSPs). The processor 1730 is in communication with the ingress ports 1710, receiver units 1720, transmitter units 1740, egress ports 1750, and memory 1760. The processor 1730 comprises a routing module 1770. The SFC module 1770 implements the disclosed embodiments described herein. For instance, the SFC module 1770 includes instructions that when executed by the processor 1730 implements the processes described in the present disclosure. The inclusion of the SFC module 1770 therefore provides a substantial improvement to the functionality of the node 1700 and effects a transformation of the node 1700 to a different state. Alternatively, the SFC module 1770 is implemented as instructions stored in the memory 1760 and executed by the processor 1730.

The memory 1760 may comprise one or more disks, tape drives, and solid-state drives and may be used as an overflow data storage device, to store programs when such programs are selected for execution, and to store instructions and data that are read during program execution. The memory 1760 may be, for example, volatile and/or non-volatile and may be a read-only memory (ROM), random access memory (RAM), ternary content-addressable memory (TCAM), static random-access memory (SRAM), or any other type of memory.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A service function chain (SFC) diversion method implemented by a service function (SF) node, the SFC diversion method comprising:

receiving an SFC packet;

determining, based on packet data, that the SFC packet is to be rerouted from a first Service Function Forwarder (SFF) of the SFC to a second SFF of the SFC;

modifying a service index (SI) in a network service header (NSH) of the SFC packet to reroute the SFC packet to the second SFF; and transmitting the SFC packet.

2. The SFC diversion method of claim 1, wherein the SFC packet is received from a third SFF of the SFC, and wherein transmitting the SFC packet comprises returning the SFC packet with the SI as modified to the third SFF for forwarding to the second SFF.

3. The SFC diversion method of claim 1, wherein the SF node is also configured as an SFF, and wherein transmitting the SFC packet comprises transmitting the SFC packet with the SI as modified to the second SFF.

4. The SFC diversion method of claim 1, further comprising modifying a service path index (SPI) in the NSH.

5. The SFC diversion method of claim 1, wherein the second SFF is an existing SFF along a Service Function Path (SFP) of the SFC packet or a new SFF added to the SFC.

6. A service function chain (SFC) multi-path diversion method implemented by a service function (SF) node, the SFC multi-path diversion method comprising:

receiving a SFC packet;

determining, based on packet data, that the SFC packet is to be diverted to multiple Service Function Paths (SFPs) of the SFC;

generating a copy of the SFC packet for each of the multiple SFPs to produce a plurality of diverted SFC packets;

modifying the plurality of diverted SFC packets to include merging information for merging the plurality of diverted SFC packets; and transmitting the plurality of diverted SFC packets.

7. The SFC multi-path diversion method of claim 6, wherein the SFC packet is received from a Service Function Forwarder (SFF) of the SFC, and wherein transmitting the plurality of diverted SFC packets comprises returning the plurality of diverted SFC packets to the SFF.

8. The SFC multi-path diversion method of claim 7, further comprising removing unnecessary saved metadata from one or more of the diverted SFC packets in the plurality of diverted SFC packets prior to returning the plurality of diverted SFC packets to the SFF.

9. The SFC multi-path diversion method of claim 6, wherein the SF node is also configured as a Service Function Forwarder (SFF), and wherein transmitting the plurality of diverted SFC packets comprises transmitting each of the diverted SFC packets to a different SFF of the SFC.

10. The SFC multi-path diversion method of claim 9, further comprising modifying, in each of the plurality of diverted SFC packets, a Service Path Identifier (SPI) field in a network service header (NSH) from a first SPI to a second SPI corresponding to a rendezvous point (RP) node.

11. The SFC multi-path diversion method of claim 10, further comprising modifying, in each of the plurality of diverted SFC packets, a Service index (SI) field in the NSH from a first SI to a second SI corresponding to the RP node.

12. The SFC multi-path diversion method of claim 11, wherein modifying each of the plurality of diverted SFC packets to include merging information for merging the plurality of diverted SFC packets comprises:

constructing, for each of the plurality of diverted SFC packets, rendezvous point information (RePIn) data structure for merging the plurality of diverted SFC packets at a Rendezvous point; and inserting, in each of the plurality of diverted SFC packets, the RePIn data structure into the NSH.

13. The SFC multi-path diversion method of claim 12, wherein inserting the RePIn data structure into the NSH comprises inserting the RePIn data structure into the NSH preceding any existing RePIn data structure in the NSH.

14. The SFC multi-path diversion method of claim 12, wherein inserting the RePIn data structure into the NSH comprises inserting the RePIn data structure into a second NSH and inserting the second NSH after the NSH.

15. The SFC multi-path diversion method of claim 12, wherein the RePIn data structure comprises the first SPI, the first SI, a packet identification data structure, a saved metadata data structure, and a saved time to live (TTL) data structure, wherein the saved metadata data structure comprises metadata from the NSH to be restored in a merged SFC packet at the RP node using the plurality of diverted SFC packets, and wherein the saved TTL data structure comprises a TTL to be restored in the merged SFC packet at the RP node using the plurality of diverted SFC packets.

16. The SFC multi-path diversion method of claim 15, further comprising setting a new TTL for one or more diverted SFC packet of the plurality of diverted SFC packets.

17. A service function chain (SFC) merging method implemented by a service function (SF) node, the SFC merging method comprising:

receiving a plurality of diverted SFC packets;

determining a set of matching diverted SFC packets from the plurality of diverted SFC packets;

merging the set of matching diverted SFC packets into a merged SFC packet; and transmitting the merged SFC packet.

18. The SFC merging method of claim 17, further comprising buffering the set of matching diverted SFC packets in a memory buffer until all SFC packets in the set of matching diverted SFC packets are received.

19. The SFC merging method of claim 17, wherein merging the set of matching diverted SFC packets into the merged SFC packet comprises extracting merging information from each diverted SFC packet in the set of matching diverted SFC packets.

20. The SFC merging method of claim 17, further comprising restoring a saved time to live (TTL) from a diverted SFC packet in the set of matching diverted SFC packets into a network service header (NSH) of the merged SFC packet.

* * * * *